United States Patent [19]
Taft et al.

[11] Patent Number: 5,183,318
[45] Date of Patent: Feb. 2, 1993

[54] ENDLESS TRACK CHAIN FOR TRACK-TYPE VEHICLES

[75] Inventors: Morris E. Taft, Metamora; Peter W. Anderton, Peoria; Roy L. Maguire, Edelstein, all of Ill.

[73] Assignee: Caterpillar Inc., Peoria, Ill.

[21] Appl. No.: 797,833

[22] Filed: Nov. 26, 1991

[51] Int. Cl.$^5$ .................................. B62D 55/092
[52] U.S. Cl. .................. 305/39; 305/58 R; 305/11
[58] Field of Search ............ 305/39, 42, 58 R, 58 PC, 305/59, 11, 14

[56] References Cited

U.S. PATENT DOCUMENTS

| | | | |
|---|---|---|---|
| 2,551,695 | 5/1951 | Oddy | 305/2 |
| 2,743,140 | 4/1956 | Bauer, Jr. | 305/10 |
| 3,469,891 | 9/1969 | Deli | 305/11 |
| 3,492,054 | 1/1970 | Boggs et al. | 305/11 |
| 3,574,419 | 4/1971 | Hatch | 305/11 |
| 3,958,836 | 5/1976 | Brown et al. | 305/58 PCX |
| 4,120,537 | 10/1978 | Roley et al. | 305/14 |
| 4,126,359 | 11/1978 | Holze | 305/11 |
| 4,204,716 | 5/1980 | Baylor | 305/58 RX |
| 4,423,910 | 1/1984 | Narang | 305/54 |
| 4,438,981 | 3/1984 | Harms | 305/58 RX |
| 4,582,366 | 4/1986 | Burfield et al. | 305/11 |
| 4,618,190 | 10/1986 | Garman et al. | 305/58 RX |
| 5,069,509 | 12/1991 | Johnson et al. | 305/58 PC |

FOREIGN PATENT DOCUMENTS 208301 12/1967 U.S.S.R. ................. 305/59

Primary Examiner—Russell D. Stormer
Attorney, Agent, or Firm—O. Gordon Pence

[57] ABSTRACT

An endless track chain with a rotatable bushing is disclosed that utilizes sleeve bearings for rotatably mounting the inboard end collars of the links about the pin. The joint of the track chain is sealed and lubricated. Sealing rings for the joint incorporates the use of a second set of seals for sealing between the rotatable bushing and the inboard end collars of the link. A unique design for the links enables the chain to accommodate the second set of seals without any loss of structural integrity in the chain or any disadvantageous increase in rail gauge width ('G') of the chain. The track chain also utilizes a punch for mechanically interlocking the outboard end collars of the links to the end portions of the pin to eliminate joint end play.

20 Claims, 3 Drawing Sheets

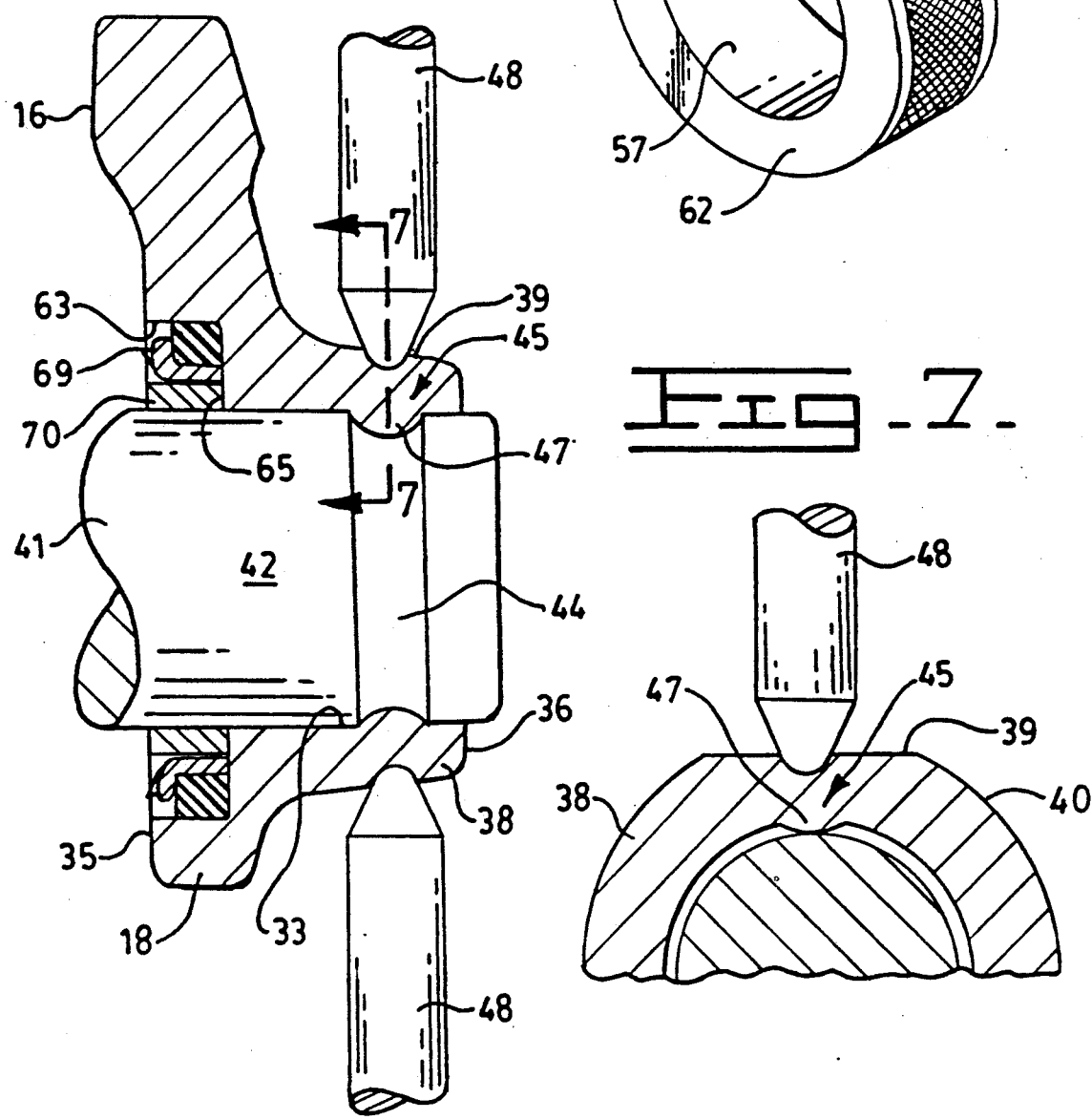

ENDLESS TRACK CHAIN FOR TRACK-TYPE VEHICLES

TECHNICAL FIELD

This invention relates generally to endless track for use on track-type vehicles and the like and, more particularly, to an improved track chain with a rotatable bushing to provide the track chain with longer external bushing life.

BACKGROUND ART

The tracks on track-type earthmoving vehicles work in an adverse, highly abrasive environment. As a consequence, the various track components wear out and must be replaced from time to time. Such track typically consists of an endless track chain and ground engaging track shoes. The track shoes are normally bolted onto the link assembly and are therefore readily replaceable independently of the other components of the track. Typical track chains, on the other hand, generally consist of links, pins, and bushings, as well as seals, thrust rings and lubricants. Such components of the track chain are assembled by pressing the respective ends of the links onto the pins and bushings by means of a high-capacity track press. Such a high-capacity track press typically produces 100 tons of force and is also required to disassemble such chains. Accordingly, replacement of nay one of the particular components of the chain that wears out entails the removal of the track from the vehicle and its portage to a track service facility equipped with a track press. This whole procedure is quite expensive and time consuming. It is therefore desirable and advantageous to minimize the number of times such track chain is disassembled during its service life. In the past, this has been difficult to achieve because each of the various chain components had its own particular wear life that could vary significantly from the wear lives of the other components. In short, one component would wear out long before the other components would. Some fifteen years ago, internal pin and bushing wear caused the pin and bushing to be the shortest lived components. This was corrected by the introduction of sealed and lubricated track that virtually eliminated internal pin and bushing wear. This increased track life to a point to where the bushing now wears out first due to external wear.

External track bushing wear occurs because bushings function as drive members. Such track bushings engage the toothed drive sprocket of the vehicle and the large locomotive force form the vehicle is transmitted form the drive sprocket into the track through the bushings. External bushing wear principally occurs due to scrubbing contact with the teeth of the drive sprocket as the bushing engages and disengages the drive sprocket. This wear occurs only at one spot or on one side of the bushing as the bushing remains stationary or fixed relative to the links to which they are attached during operation. Additionally, the typical environment of such vehicles contains considerable abrasive materials such as sand, dust, dirt and mud. Because of all of this, that portion of the external surface of the bushing which engages the sprocket is subject to a high degree of wear, while the rest of the external surface of the bushing receives little or no wear at all. In order to obtain additional wear life form the bushing, a procedure known as turning the bushings has been commonly employed. Bushing turning, unfortunately, also requires the undesirable disassembly of the track chain.

It has been recognized for some time that external bushing life could be extended by making the bushing rotatable. One such design is disclosed in U.S. Pat. No. 3,492,054 for Track Hinge Joints With Rotating Bushings that issued Jan. 27, 1970 to R. L. Boggs et al. and assigned to the assignee hereof. Such rotating bushing design was not commercialized, however, because of other problems it introduced. One such problem was the loss of structural rigidity in the track chain. Such loss is due to the fact that the bushing is no longer secured to the links. The ensuing flexure may lead to an excessive amount of end play in the joint beyond the capacity of the seals to seal, resulting in the loss of lubricant. Any loss of lubricant is critical because of the limited supply of lubricating oil contained in the track joint. This problem is magnified in the Boggs et al. design because the joint has twice the number of seals (four versus two). A failure of any one of such seals will result in early joint failure. Another problem was in the use of the track link itself as the bearing for the pin for purposes of track articulation. The link lacks sufficient hardness and other material characteristics to serve as a bearing for an adequate service life period.

The solution to the above problems is hampered by a third problem, which is inability to change certain dimensions of the track. One such dimension is the rail-to-rail width or gauge of the track. Like railroad track, the track links provide a pair of rail surfaces on which the wheels or rollers of the vehicle ride. The rail width or gauge for any particular vehicle is, for all practical purposes, permanently set and cannot be changed. This is because any change in rail gauge would require corresponding changes in the remaining components of the vehicle undercarriage and because the changed track would not be interchangeable with the track on existing vehicles.

The present invention is directed to overcoming the shortcomings of the prior attempts at providing a track with longer external bushing life.

DISCLOSURE OF THE INVENTION

In accordance with one aspect of the present invention, there is provided an endless track chain for track-type vehicles in which the chain has a plurality of link sets articulately coupled in transverse relation to a longitudinal centerline of the cain by a like plurality of joints. Each link set includes a pair of laterally spaced longitudinally extending links, each link having a laterally inwardly offset inboard end collar, and opposite laterally outwardly offset outboard end collar and a longitudinally disposed rail surface. The inboard end collar is provided with a first bore therethrough which extends from an inner surface to an outer surface of such inboard and collar. The outboard end collar is provided with a second bore therethrough extending from an inner surface to an outer surface of such outboard end collar. The first bore is provided with a predetermined bore length that is greater than one-half the width of the rail surface. Likewise, the second bore is provided with a predetermined bore length that is at least as great as the overall width of the rail surface.

In accordance with another aspect of the present invention, there is provided a tubular bushing which is disposed about and freely rotatable relative to a pin of such joint. The bushing is of a size to extend between and to be freely rotatable relative to the inboard end collars as well. A pair of hardened sleeve bearings are mounted within the first bores of the inboard end collars to rotatably mount the pin relative to the inboard end collars.

In accordance with a further aspect of the present invention, means are provided for mechanically interlocking the pin within the second bores of the outboard end collar portions to prevent axial movement between the pin and the link. The joints are also preferably provided with sealing and lubricating means.

BRIEF DESCRIPTION OF THE DRAWINGS

FIG. 5 is an enlarged perspective of one of the sleeve bearings shown in the joint of FIG. 3;

FIG. 6 is a fragmentary cross-sectional view of one of the joints shown in FIG. 3 and illustrating preferred means for mechanically interlocking the pin to the link; and FIG. 7 is a fragmentary cross-sectional view taken along lines 7—7 of FIG. 6 further illustrating the preferred interlocking means.

BEST MODE FOR CARRYING OUT THE INVENTION

Figure 1:
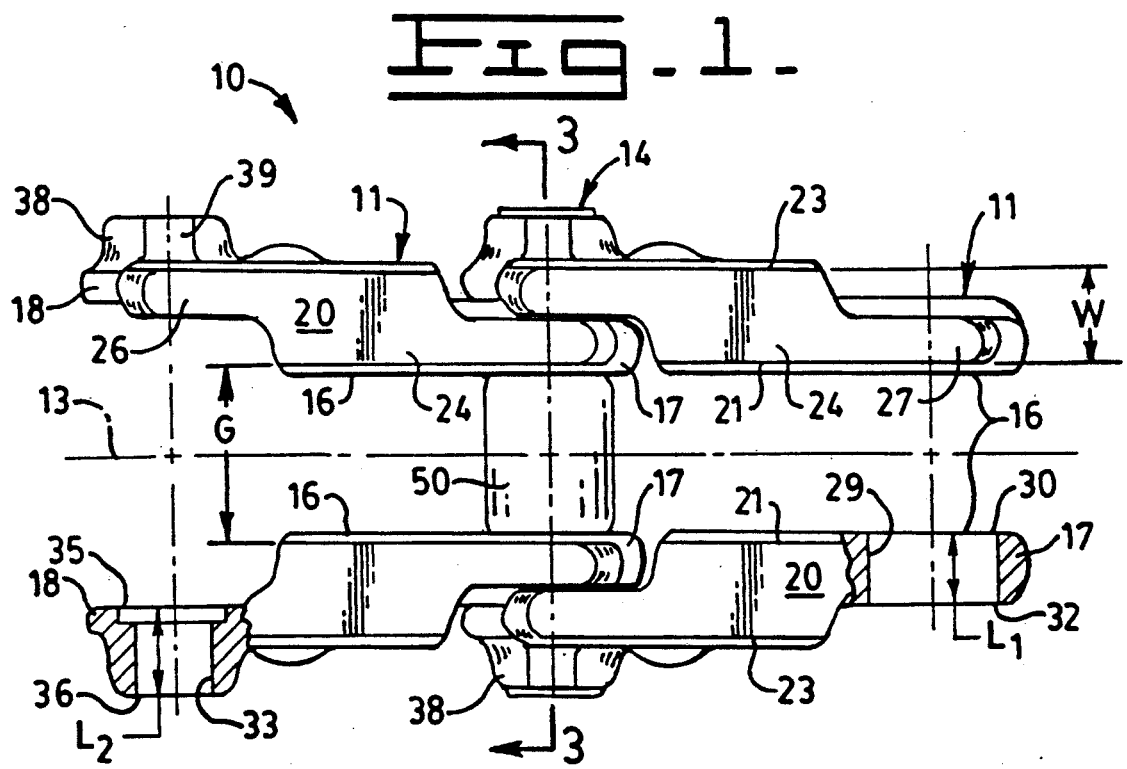
FIG. 1 is a plan view of a portion of an endless track chain embodying the principles of the present invention.
Figure 2:
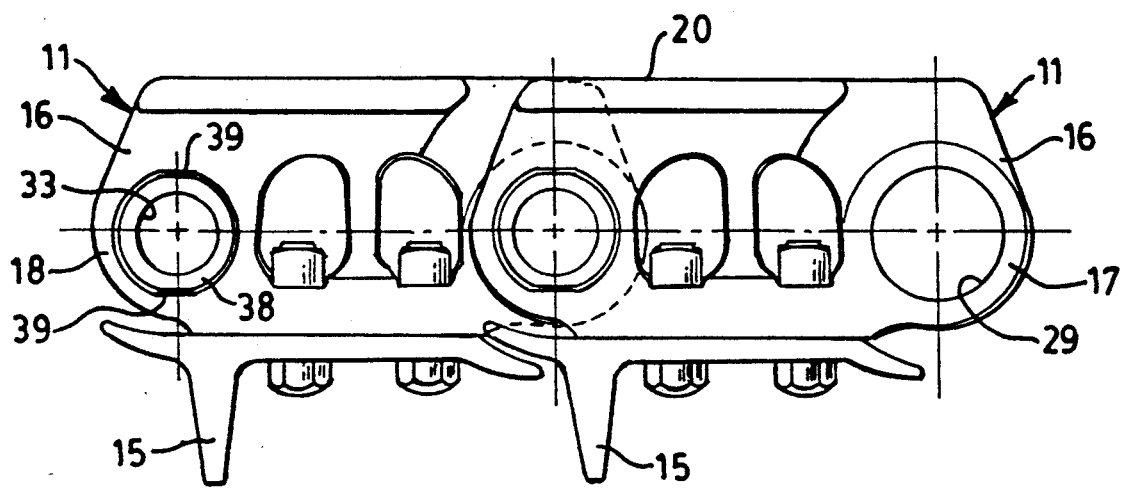
FIG. 2 is a side elevational view of the track chain shown in FIG. 1, but with track shoes added thereto.
Figure 4:
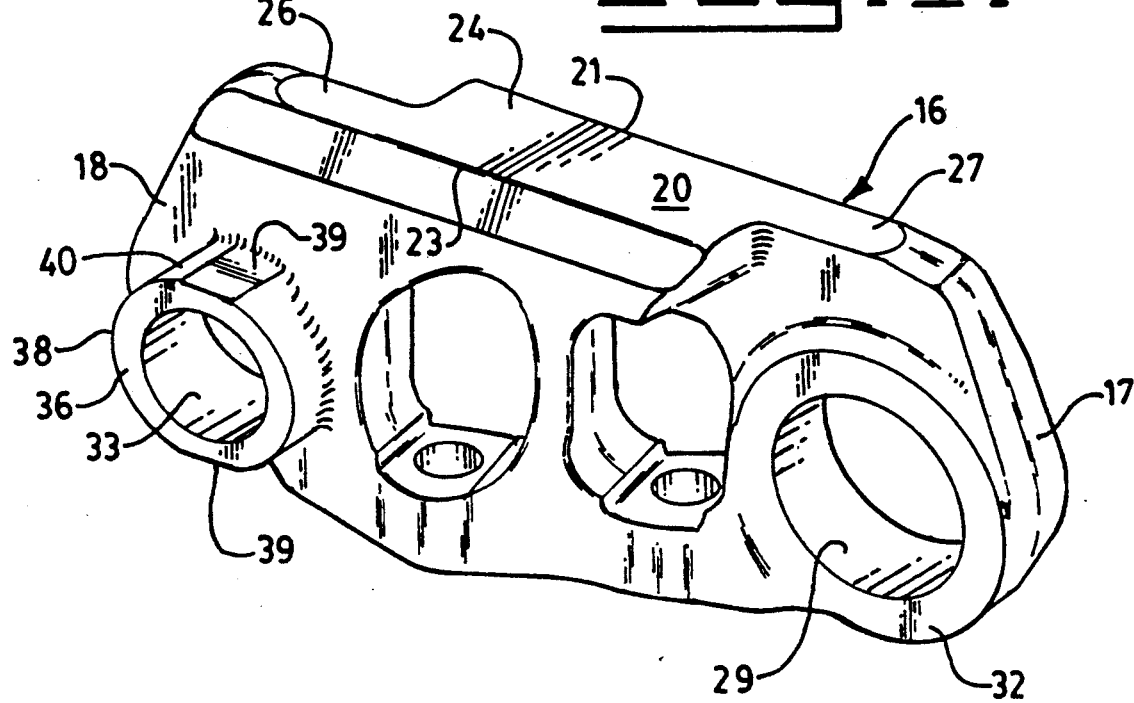
FIG. 4 is a full perspective view of one of the track links of the track chain shown in FIG. 1.

Referring more particularly to the drawings, an endless track chain embodying the principles of the present invention is generally indicated at 10 in FIGS. 1 and 2 for use on a track-type vehicle (not shown). Track chain 10 is constructed from a plurality of link sets 11 which are articulately coupled in a transverse relation along a longitudinal centerline 13 of the chain 10 by a like plurality of hinge joints 14. A like plurality of track shoes (15) (FIG. 2) are bolted to the link sets 11. Each link set 11 includes a pair of laterally spaced, longitudinally extending links, one being a right-hand link and the other being a left-hand link. As such links are mirror images of each other, both are referred to herein by reference numeral 16. Each link 16 is provided with an inboard end collar 17 and an opposite outboard end collar 18. The inboard end collar 17 is laterally offset inwardly toward the centerline 13 of the chain 10, while the outboard end collar 18 is laterally offset outwardly therefrom. Link 16 further includes a longitudinally disposed rail surface 20. As best shown in FIGS. 1 and 4, such rail surface 20 has a predetermined overall width "W" between an inner edge 21 and an outer edge 23. Such rail surface 20 includes a full width central portion 24, a generally one-half width outboard portion 26 which extends along the outer edge 23 over the outboard end collar 18 and a generally one-half width inboard portion 27 which extends along the inner edge 23 over the inboard end portion 17. The distance between the inner edge 21 of one link in the link set 11 to the inner edge 21 of the other link defines a rail gauge width "G".

The inboard end collar 17 has a first board 29 therethrough which extends from an inner surface 30 (FIG. 1) of the inboard end collar to an outer surface 32 thereof. The inner surface 30 is offset inwardly from the inner edge 21 of the rail surface 20. The outer surface 32 is offset outwardly relative to the inboard portion 27 of the rail surface 20 so as to be disposed in a position substantially closer to the outer edge 23 of the rail surface 20 than to the inner edge 21 thereof. This offset positioning of the inner and outer surface 30, 32, respectively, provide the first bore 29 with a predetermined bore length "L$_1$" (FIG. 1) that is greater than one-half the width of the rail surface 20. Preferably, the outer surface 32 is positioned within a range of from substantially greater than 0.50 times to less than 1.0 times the rail width "W" from the inner rail edge 21.

Figure 3:
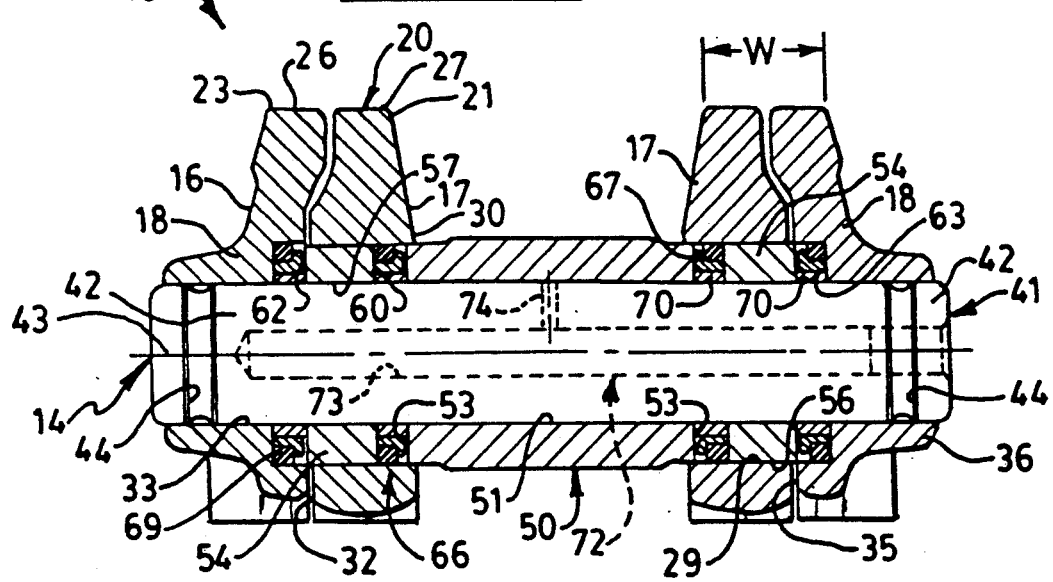
FIG. 3 is a transverse cross-sectional view taken along lines 3—3 of FIG. 2 through a hinge joint thereof, but with the track shoes removed.

The outer end collar 18 has a second bore 33 therethrough which extends from an inner surface 35 to an outer surface 36 of the end collar 18. As best shown in FIG. 3, each second bore 33 has a counterbore 63 adjacent the inner surface 35. Each counterbore 63 has a radial shoulder 65 at the bottom thereof that is disposed outwardly form the inner surface 35. The inner surface 35 is likewise offset outwardly from the inboard portion 27 of the rail surface 20 so as to lie outboard of the offset outer surface 32 of the inboard end collar 17 of an adjoining oink in the track chain 10. It should be appreciated that the offsetting relationship of the end collars 17, 18 permits the outboard end collars 18 of one link set to overlap the inboard end collars 17 of an adjoining link set in the track chain. As shown in the drawings, the outboard surface 36 of the outboard end collar 18 is provided on a thin walled pin boss 38. The outer surface 36 is thus offset laterally a substantial distance from the outer edge 23 of the rail surface 20 to provide the second bore 33 with a predetermined bore length "L$_2$" that is at least as great as the overall width "W" of the rail surface 20. Preferably, the outer surface 36 is offset laterally at least 0.75 times the rail width "W" beyond the outer edge 23 of the rail surface 20. For purposes hereinafter described, the boss 38 has at least one flat 39 formed on its outer periphery 40. More advantageously, the boss 38 has two flats 39 oriented opposite each other or disposed 180° apart, as shown in FIG. 2.

Referring more particularly to FIG. 3, the joint 14 includes a cylindrical pin 41, a rotatable tubular bushing 50 and a pair of hardened sleeve bearings 54. The pin 41 has opposite end portions 42, each of which is pressed and non-rotatably mounted into a respective one of the second bores 33 of the outboard end collars 18 of each link 16 in a link set 11.

The joint 14 further includes means 45 for mechanically interlocking the pin 41 within such bores 33 to prevent any axial movement of the links 16 along a central axis 43 of the pin 41. One type of means 45 for mechanically interlocking the pin 14 to the links 16 is that apparatus disclosed and described in U.S. Pat. No. 4,618,190, entitled Track Joint Retaining Apparatus, issued Oct. 21, 1986, and which is incorporated hereinto by this reference. As best shown in FIGS. 6 and 7, another preferred mechanically interlocking means 45 comprises a circumferentially disposed, generally arcuately shaped groove 44 formed about each of the end portions 42 of the pin 41 and at least one mechanically formed nodule 47 which protrudes radially inwardly from each of the second bores 33 into a respective one of the grooves 44. The mechanically formed nodules 47 are preferably formed by mans of a punch device 48. Preferably, a pair of such punch devices are located perpendicular to the pin axis on each of the flats 39 provided on the pin boss 38. The application of a sufficient force of the punch devices 48 will result in the extrusion of the boss metal into the groove 344.

The tubular busing 50 is provided with a pin bore 51 which is of a size sufficient to freely rotatably mount the bushing 50 about the pin 41. Bushing 50 has a pair of opposite end faces 53 and is of a size to extend between and to freely rotatable relative to the inboard end collars 17.

As best shown in FIG. 5, the pair of hardened sleeve bearings 54 each have an outer peripheral surface 55, an inner bearing surface 57, an inner end face 60, and an opposite outer end face 62. The sleeve bearings 54 are adapted to be press fitted into the first bores 29 of the inboard end collars 17. It should be understood by those skilled in the art that such sleeve bearings 54 must have a certain minimum length that is sufficient to support the loads imposed upon the joint 14 during operation, as dictated by the weight and power of the vehicle on which the track chain 10 is placed. As can be seen, the first bores are substantially larger than the second bores 33 in order to receive the sleeve bearings 54. Each outer surface 56 is of a size sufficient to non-rotatably mount the bearings within bores 29. To greatly resist any rotational movement of the sleeve bearing 54 within the first bores 29, the outer surface 56 of each bearing is preferably provided with a knurled central portion 59. After the bearings 54 are press fitted into the first bores 29, the knurls imbed themselves into the softer metal of the link bore 29 and grip the bore and, in effect, mechanically interlock the sleeve bearings 54 to the first bores 29. The inner bearing surface 57 is of a size to freely rotatably mount the pin 41 therewithin. The sleeve bearing 54 is also hardened to provide greater wear life. The bearing surface 57 and the end faces 60, 62 are provided with a hardness of at least Rockwell C 55 and, preferably, a hardness of Rockwell C 57-62.

Means 72 for lubricating the joint 14, as well as means 66 for sealing lubricant in and abrasives out of joint 14, are also provided. Lubricating means 72 includes a plugged bore in the pin 41 defining a lubricant reservoir 73 and a radial passage 74. Passage 74 communicates lubricant in the reservoir 73 with the pin bore 51 of the bushing 50 and the inner bearing surfaces 57 of the sleeve bearings 54.

Seal means 66 includes a first pair of seals 67 to provide sealing between the bushing 50 and the inboard end collars 17 and a second pair of seals 69 to provide sealing between the inboard end collars 17 and the outboard end collars 18. Each of the first pair of seals 67 is disposed in a respective one of the first bores 29 of the inboard end collars between the inner end face 60 of the sleeve bearing 54 and the adjacent end face 53 of a bushing 50 and in sealing engagement with such bushing end face 53. One of the second pair of seals 69 is disposed within each of the counterbores 63 between the shoulder 65 of the counterbore and the adjacent outer end face 62 of the sleeve bearings 54 and in sealing engagement against the outer end face 62.

A set of four thrust rings 70 are disposed internally of each of the seals 67, 69. The thrust rings 70 are provided to maintain a predetermined minimum axial spacing for the seals 67, 69 to prevent the seals from being crushed during assembly or operation.

Industrial Applicability

The endless track chain 10 constructed in accordance with the teachings of the present invention advantageously provides significantly improved bushing wear life and lower maintenance costs. These advantages are provided without a loss of structural integrity or load carrying capacity of the track chain 10 or any disadvantageous increase of the rail gauge dimension "G".

Bushing wear life in the present track is increased by the fact that the bushing 50 is rotatably mounted relative to the links 16. This significantly reduces frictional wear on the bushing, as well as the sprocket of the vehicle, because the scrubbing action which occurs between the sprocket and the fixed or non-rotatable bushing of prior track chains is eliminated. Rotation of the bushing 50 during operation also allows wear to occur uniformly about the entire circumference of the bushing, instead of at just one location of such prior fixed bushing track chains. Furthermore, the necessity of disassembling the track chain to turn the bushings of prior chains is eliminated. Thus, the present rotatable bushing track chain 10 requires less servicing, which lowers maintenance costs.

The use of a rotatable bushing 50 in the present invention is made commercially practical by the use of hardened sleeve bearings 54 that are non-rotatably mounted in the first bores 29 of the inboard end collars 17. Such sleeve bearings 54 are provided with a sufficient hardness to withstand the large driving forces that are exerted on the track chain 10 during operation without fretting or galling of its bearing surface 57.

Lubricating means 72 are provided to lubricate the joint 14 and negate internal frictional wear between the pin 41 and sleeve bearings 54 and the bushing 50 where relative pivotal movement occurs. Sealing means 66 are provided in the joint 14 to seal in lubricant and to seal out abrasives. As previously described, the sealing means 66 includes first and second pairs of seals 67, 69. The second pair of seals 69 are conventionally located in counterbores 63 in the outboard end collars 18 of the links 16 to seal between outboard end collars 18 of the links 16 to seal between overlapping inboard and outboard end collars 17, 18 of adjoining link sets 11. The first pair of seals 67 are an additional set of seals that are incorporated into the present track chain joint 14 to seal in lubricant and seal out abrasive materials between the rotatable bushing 50 and the inboard end collars 17.

The present invention advantageously provides the additional space needed to accommodate both the first and second pairs of seals 67, 69 without any increase in the rail gauge width "G" or loss in the structural integrity of the track chain 10. This advantage is achieved by the use of an unique link design in the present invention. Such link design provides the first bore 29 in the inboard end collars of the links with a longer bore length "$L_1$" that is generally equal to the length of one of the sleeve bearings 54, plus the length of one of the trust rings 70 so as to accommodate such sleeve bearing 54 and one of the first pair of seals 69 within the length of first bore 29. Thus, a press fitted connection along the full length of the sleeve bearings 54 is provided in order to maintain the structural integrity of the joint 14 during track operation. Likewise, each of the second bores 33 in the outboard end collars 18 of the links 16 is provided with an increased bore length "$L_2$" sufficient to provide for the press length on the pin end portion 42 required to maintain the structural integrity of the joint 14 during track operation, while providing the length needed to accommodate its counterbore 63 and the pin groove 44. These bore lengths, "$L_1$", "$L_2$", are provided in the design of the link 16 by offsetting the bore lengths relative to their respective half-width portions 26, 27 of the rail surface 20 on the links 16. The overall width of the joint is increased without disturbing the location of the rail surface 20, thus allowing the rail gauge "G" to be maintained at a desired dimension, or not increased, so as not to effect the other components of the track-type vehicle or prevent the use of the present track chain 10 as a replacement for existing types of track chains.

Mechanical interlocking means 45 are provided to eliminate end play in the joint. The interlocking means 45 includes the incorporation of grooves 44 about the end portions 42 of the pin 41. Once the track chain 10 is assembled in a conventional manner with a track press, a suitable punch device 48 is placed on each of the flats 39 provided on the bosses 38 of the outboard end collars 18 and in radial alignment with the grooves 44 in the pin end portions 42. The flats 39 help prevent the punch device 48 from slipping, which might otherwise occur if placed against a cylindrical surface. A suitable force is then applied to the punch devices 48 by means of a press or the like to extrude metal from the boss 38 into the pin grooves 44, thus forming a mechanically formed nodule 47 of the boss metal protruding from the second bore 33 into the groove 44, such nodule 47 having a cross-sectional configuration substantially conforming to the arcuate shape of the pin groove 44. In operation, the nodule 47 prevents any axial movement of the pin 41 in the second bore 33 of the outboard end collars 18, thus ensuring that the joint 14 remains tight without any end play that could result in the unloading of the sealing force of the seals 67, 69, thereby preventing the loss of lubricant from the joint 14.

Other aspects, objects and advantages of the present invention can be obtained for a study of the drawings, the disclosure and the appended claims.

We claim:

1. In an endless track chain for track-type vehicles, said chain having a plurality of link sets articulately coupled in transverse relation to a longitudinal centerline of said cain by a like plurality of joints, each link set including a pair of laterally spaced, longitudinally extending links, each link having a laterally inwardly offset inboard end collar, an opposite laterally outwardly offset outboard end collar and a longitudinally disposed rail surface, said rail surface having a predetermined overall width ("W") between an inner edge and an outer edge and a full width central portion, a generally half-width outboard portion extending along said outer edge over said outboard end collar and a generally half-width inboard portion extending along said inner edge over the inboard end collar, the improvement comprising:

said inboard end collar having a first bore therethrough and extending from an inner surface of said inboard end collar to an outer surface thereof, said inner surface being offset inwardly from said inner edge of said rail surface and said outer surface being offset outwardly relative to said inboard portion of said rail surface so as to be disposed in a position substantially closer to said outer edge of said rail surface than to said inner edge thereof, said offset positioning of said inner and outer surfaces providing said first bore with a predetermined bore length ("$L_1$") that is greater than one-half the width ("W") of said rail surface; and said outboard end collar having a boss extending outwardly therefrom and a second bore therethrough and extending from an inner surface of said outboard end collar to an outer surface on said boss, said inner surface being likewise offset outwardly from said inboard portion of said rail surface so as to lie outboard of the offset outer surface of the inboard end collar of a mating link in an adjoining link set of said track chain, and said outer surface on said boss being offset laterally a substantial distance from said outer edge of said rail surface to provide said second bore with a predetermined bore length ("$L_2$") that is at least as great as the overall width ("W") of said rail surface.

2. The track chain of claim 1, wherein each of said first bores of said inboard end collars has a size substantially larger than the size of said second bores of said outboard end collars and wherein said joints further include:

a cylindrical pin having opposite end portions, each end portion being pressed and non-rotatably mounted into a respective one of said second bores of said outboard end collars;

a tubular bushing of a size to extend between and to be freely rotatable relative to said inboard end collars and having a in bore of a size sufficient to freely rotatably mount said bushing about said pin; and a pair of hardened sleeve bearings, each having an outer peripheral surface and an inner bearing surface, said outer surface being of a size sufficient to non-rotatably mount said bearing within a respective one of said first bores of each inboard end collars and said inner baring surface being of a size to freely rotatably mount said pin therewithin.

3. The track chain of claim 2, wherein said bearing surface of said sleeve bearing has a hardness of at least Rockwell C 55.

4. The track chain of claim 3, wherein at least a central portion of said outer peripheral surface of each of said sleeve bearings is knurled.

5. The track chain of claim 4, wherein said bushing has a pair of opposite end faces and each of said sleeve bearings has an inner end face and an opposite outer end face and has a length sufficient to locate said inner end face within said first bores of the inboard end collars at a predetermined distance from said inner surface of said inboard end collar the respective adjacent end face of said bushing, and wherein sid outboard end collars of each link has a counterbore about said second bore thereof extending outwardly from sid inner surface of said outboard end collar and having a shoulder at the bottom thereof, said joints of said track chain further including:

a first pair of seals, each first seal being disposed between a respective one of said inner end faces of said sleeve bearing and the adjacent end face of sid bushing and in sealing engagement with said bushing end face;

a second pair of seals, each second seal being disposed between a respective one of said shoulders of sid counterbores and the adjacent outer end face of said sleeve bearings and in sealing engagement against said outer end face; and means for lubricating said joint.

6. The track chain of claim 5, wherein said each of said joints further includes:

means for mechanically interlocking said pin within said second bore to prevent axial movement between said pin and said link.

7. In an endless track chain for track-type vehicles, said chain having a plurality of link sets articulately coupled in transverse relation to a longitudinal centerline of said chain by a like plurality of joints, each link set including a pair of laterally spaced, longitudinally extending links, each link having a laterally inwardly offset inboard end collar and an opposite laterally outwardly offset outboard and collar, the improvement wherein each joint comprises:

each inboard end collar of each link having a first bore therethrough and each outboard end collar having a second bore therethrough, said first bores being substantially larger than said second bores;

a pin having opposite end portions, each of such end portions being non-rotatably secured within a respective one of said second bores of said outboard end collars;

a tubular bushing of a size to extend between and to be freely rotatable relative to said inboard end collars and having a pin bore of a size sufficient to freely rotatably mount said bushing about said pin; and a pair of hardened sleeve bearings, each having an outer peripheral surface and an inner bearing surface, said outer surface being of a size sufficient to non-rotatably mount sid bearings within a respective one of said first bores of each inboard end collar and said inner bearing surface being of a size to freely rotatably mount said pin therewithin.

8. The track chain of claim 7, wherein:

each link has a longitudinally disposed rail surface, said rail surface having a predetermined overall width ("W") between an inner edge and an outer edge and a full width central portion, a generally half-width outboard portion extending along said outer edge over said outboard end collar and a generally half-width inboard portion extending along said inner edge over the inboard end collar;

said first bore extends from an inner surface of said inboard end collar to an outer surface thereof, said inner surface being offset inwardly from said inner edge of said rial surface and said outer surface being offset outwardly relative to said inboard portion of said rail surface so as to be disposed in a position substantially closer to said outer edge of said rail surface than to said inner edge thereof, said offset positioning of said inner and outer surfaces providing said first bore with a predetermined bore length ("L₁") that is greater than one-half the width ("W") of said rail surface; and said second bore extends from an inner surface of said outboard end collar to an outer surface thereof, said inner surface being likewise offset outwardly from said inboard portion of said rail surface so as to lie outboard of the offset outer surface of the inboard end collar of an adjoining link in said track chain, and said outer surface being offset laterally a substantial distance from said outer edge of said rail surface to provide said second bore with a predetermined bore length ("L₂") that is at least as great as the overall width ("W") of said rail surface.

9. The track chain of claim 8, wherein said joint further includes:

means for mechanically interlocking said pin within said second bore to prevent axial movement between said pin and said link.

10. The track chain of claim 9, wherein each of said outboard end collars has a boss extending outwardly therefrom.

11. The track chain of claim 10 wherein said bearing surface and end faces of said sleeve bearing have a hardness of at least Rockwell C55.

12. The track chain of claim 11, wherein at least a central portion of said outer peripheral surface of each of said sleeve bearings is knurled.

13. The track chain of claim 12, wherein said bushing has a pair of opposite end faces and each of said sleeve bearings has an inner end face and an opposite outer end face and has a length sufficient to locate said inner end face within said first bores of the inboard end collars at a predetermined distance from said inner surface of said inboard end collar and the respective adjacent end face of said bushing, and wherein said outboard end collars of each link has a counterbore about said second bore thereof extending outwardly from said inner surface of said outboard end collar and having a shoulder at the bottom thereof, said joints of said track chain further including:

a first pair of seals, each first seal being disposed between a respective one of said inner end faces of said sleeve baring and the adjacent end face of said bushing and in sealing engagement with said bushing end face;

a second pair of seals, each second seal being disposed between a respective one of said shoulders of said counterbores and the adjacent outer end face of said sleeve bearings and in sealing engagement against said outer end face; and means for lubricating said joint.

14. An endless track chain for track-type vehicles, comprising:

a plurality of link sets, each link set including a pair of laterally spaced, longitudinally extending links, each link having a laterally inwardly offset inboard end collar, an opposite laterally outwardly offset outboard end collar and a longitudinally disposed rail surface, said rail surface having a predetermined overall width ("W"), said inboard end collar having a first bore therethrough with a predetermined bore length ("L₁") that is greater than one-half the width ("W") of said rail surface, said outboard end collar having a second bore therethrough with a predetermined bore length ("L2") that is at least as great as the overall width ("W") of said rail surface; and a like plurality of joints for articulately coupling the inboard end collars of one link set to the outboard end collars of an adjoining link set, each joint including:

a cylindrical pin having opposite end portions, each end portion being pressed and non-rotatably mounted into a respective one of said second bores of said outboard end collars;

means for mechanically interlocking said pin within said second bore to prevent axial movement between said pin and said link;

a tubular bushing of a size to extend between and to be freely rotatable relative to said inboard end collars and having a pin bore of a size sufficient to freely rotatably mount said bushing about said pin;

a pair of hardened sleeve bearings, each having an outer peripheral surface and an inner bearing surface, said outer surface being of a size sufficient to non-rotatably mount said bearing within a respective one of said first bores of each inboard and collars and said inner bearing surface being of a size to freely rotatably mount said pin therewithin;

means for lubricating said joint; and means for sealing said joint.

15. The track chain of claim 14, wherein said overall width ("W") of the rail surface of each link extends between an inner edge and an outer edge thereof, said first bore of said inboard end collar extends from an inner surface of said inboard end collar to an outer surface thereof, said inner surface being offset inwardly from said inner edge of said rail surface and said outer surface being offset outwardly relative to sid inboard portion of said rail surface so as to be disposed in a position substantially closer to said outer edge of said rail surface tan to said inner edge thereof, said outboard end collar includes a boss extending outwardly therefrom and said second bore extends from an inner surface of said outboard end collar to an outer surface on said boss thereof, said inner surface being likewise offset outwardly from said inboard portion of said rail surface so as to lie outboard of the offset outer surfaces of the inboard end collars of said adjoining link set of said track chain, and said outer surface being offset laterally at least 0.75 times the rail width ("W") beyond the outer edge of said rail surface.

16. The track chain of claim 15, wherein the outer surface of the inboard end collar is positioned within a range of from substantially greater than 0.50 times to less than 1.0 times the rail width ("W") from the inner rail edge.

17. The track chain of claim 16, wherein said bushing has a pair of opposite end faces and each of said sleeve bearings has an inner end face and an opposite outer end face and has a length sufficient to locate said inner end face within said first bores of the inboard end collars at a predetermined distance from said inner surface of said inboard end collar and the respective adjacent end face of said bushing, and said outboard end collars of each link has a counterbore about said second bore thereof extending outwardly from said inner surface of said outboard end collar and having a shoulder at the bottom thereof, and wherein said sealing means includes:

a first pair of seals, each first seal being disposed between a respective one of said inner end faces of said sleeve baring and the adjacent end face of said bushing and in sealing engagement with said bushing end face;

a second pair of seals, each second seal being disposed between a respective one of said shoulders of said counterbores and the adjacent outer end face of said sleeve bearings and in sealing engagement against said outer end face; and a set of four thrust rings, one of said thrust rings being disposed internally of a respective one of said seals.

18. The track chain of claim 17, wherein said bearing surface and end faces of said sleeve bearing have a hardness of at least Rockwell C55.

19. A longitudinally extending link for an endless track chain of track-type vehicles, said link having an inboard end collar disposed in a laterally inwardly offset relationship relative to said chain, an opposite outboard end collar disposed in a laterally outwardly offset relationship relative to said chain and a longitudinally disposed rail surface, said rail surface having a predetermined overall width ("W") between an inner edge and an outer edge and a full width central portion, a generally half-width outboard portion extending along said outer edge over said outboard end collar and a generally half-width inboard portion extending along said inner edge over the inboard end collar, wherein the improvement comprises:

said inboard end collar having a first bore therethrough and extending from an inner surface of said inboard end collar to an outer surface thereof, said inner surface being offset inwardly from said inner edge of said rail surface and said outer surface being offset outwardly relative to said inboard portion of said rail surface so as to be disposed in a position substantially closer to said outer edge of said rail surface than to said inner edge thereof, said offset positioning of said inner and outer surfaces providing said first bore with a predetermined bore length ("$L_1$") that is greater than one-half the width ("W") of said rial surface; and said outboard end collar having a second bore therethrough and extending from an inner surface of said outboard end collar to an outer surface thereof, said inner surface being likewise offset outwardly from said inboard portion of said rail surface so as to lie outboard of the offset outer surface of the inboard end collar of an adjoining link in said track chain, and said outer surface being offset laterally a substantial distance from said outer edge of said rail surface to provide said second bore with a predetermined bore length ("$L_2$") that is at least as great as the overall width ("W") of said rail surface.

20. The link of claim 19, wherein said outboard end collar includes a boss and a counterbore disposed about said second bore thereof, said counterbore being disposed at the inner end of said second bore and providing a radial shoulder that is inset from said inner surface of said outboard end collar, and said boss extending outwardly from outboard end collar.

* * * * *

UNITED STATES PATENT AND TRADEMARK OFFICE
CERTIFICATE OF CORRECTION

PATENT NO. : 5,183,318

Page 1 of 2

DATED : February 2, 1993

INVENTOR(S) : Morris E. Taft, Peter W. Anderton and Roy L. Maguire

It is certified that error appears in the above-indentified patent and that said Letters Patent is hereby corrected as shown below:

Column 8, line 22, "in" should be --pin--.

Column 8, line 30, "baring" should be --bearing--.

Column 8, line 44, after "collar" insert --and--.

Column 8, line 45, "sid" should be --said--.

Column 8, line 47, "sid" should be --said--.

Column 8, line 53, "sid" should be --said--.

Column 8, line 57, "sid" should be --said--.

Column 9, line 6, "and" should be --end--.

Column 9, line 24, "sid" should be --said--.

Column 9, line 41, "rial" should be --rail--.

Column 10, line 66, "and" should be --end--.

Column 11, line 10, "sid" should be --said--.

Column 11, line 13, "tan" should be --than--.

UNITED STATES PATENT AND TRADEMARK OFFICE
CERTIFICATE OF CORRECTION

PATENT NO. : 5,138,318

DATED : February 2, 1993

INVENTOR(S) : Morris E. Taft, Peter W. Anderton and Roy L. Maguire

It is certified that error appears in the above-indentified patent and that said Letters Patent is hereby corrected as shown below:

Column 11, line 45, "baring" should be --bearing--.

Column 12, line 32, "rial" should be --rail--.

Signed and Sealed this

Twenty-fifth Day of January, 1994

*Attest:*

BRUCE LEHMAN

*Attesting Officer*     *Commissioner of Patents and Trademarks*